United States Patent [19]

Henning et al.

[11] 4,440,551

[45] Apr. 3, 1984

[54] METHOD FOR THE ADSORPTIVE REMOVAL OF HYDROGEN SULFIDE FROM GAS MIXTURES

[75] Inventors: Klaus-Dirk Henning; Jürgen Klein, both of Essen; Burkhard Harder, Hattingen, all of Fed. Rep. of Germany

[73] Assignee: Bergwerksverband GmbH, Essen, Fed. Rep. of Germany

[21] Appl. No.: 289,515

[22] Filed: Aug. 3, 1981

[30] Foreign Application Priority Data

Aug. 1, 1980 [DE] Fed. Rep. of Germany ....... 3029187

[51] Int. Cl.³ ............................................. B01D 53/04
[52] U.S. Cl. ............................................ 55/73; 55/75
[58] Field of Search ......................... 55/58, 73, 74, 75

[56] References Cited

U.S. PATENT DOCUMENTS

| 3,345,125 | 10/1967 | Kruel et al. | 55/73 X |
| 3,502,427 | 3/1970 | Johswich | 55/73 |
| 3,634,028 | 1/1972 | Hohne | 55/73 X |
| 3,672,125 | 6/1972 | Miller | 55/73 |
| 3,801,513 | 4/1974 | Munzner et al. | 55/75 X |
| 3,909,449 | 9/1975 | Nagai et al. | 55/73 X |
| 3,953,345 | 4/1976 | Saito et al. | 55/73 X |
| 3,962,129 | 6/1976 | Munzner et al. | 55/75 X |
| 3,988,129 | 10/1976 | Fornoff et al. | 55/73 X |
| 4,082,694 | 4/1978 | Wennerberg et al. | 55/75 X |
| 4,261,709 | 4/1981 | Itoga et al. | 55/75 X |
| 4,302,221 | 11/1981 | Tanaka | 55/73 X |

FOREIGN PATENT DOCUMENTS 2530091 1/1976 Fed. Rep. of Germany .
2013604 3/1977 Fed. Rep. of Germany .

*Primary Examiner*—Robert H. Spitzer
*Attorney, Agent, or Firm*—Michael J. Striker

[57] ABSTRACT

A method is disclosed for the adsorptive removal of $H_2S$ from gas mixtures in C-containing adsorption agents with 1–80 bar pressures and regeneration, employing pressure lowering and/or temperature change and simultaneous rinsing with an at most negligibly absorbable component of the gas mixture. A carbon molecular sieve of fossil and/or bituminous fuel is used, with for pore diameter less than 10 nm a pore volume of 15–25 $cm^3/100$ g, and micropore volume in pore diameter range 0.35–10 nm less than 10 $cm^3/100$ g. The inner surface of the molecular screen can be freed of surface groups capable of reacting with the $H_2S$ by aftertreatment with reducing gas.

4 Claims, 1 Drawing Figure

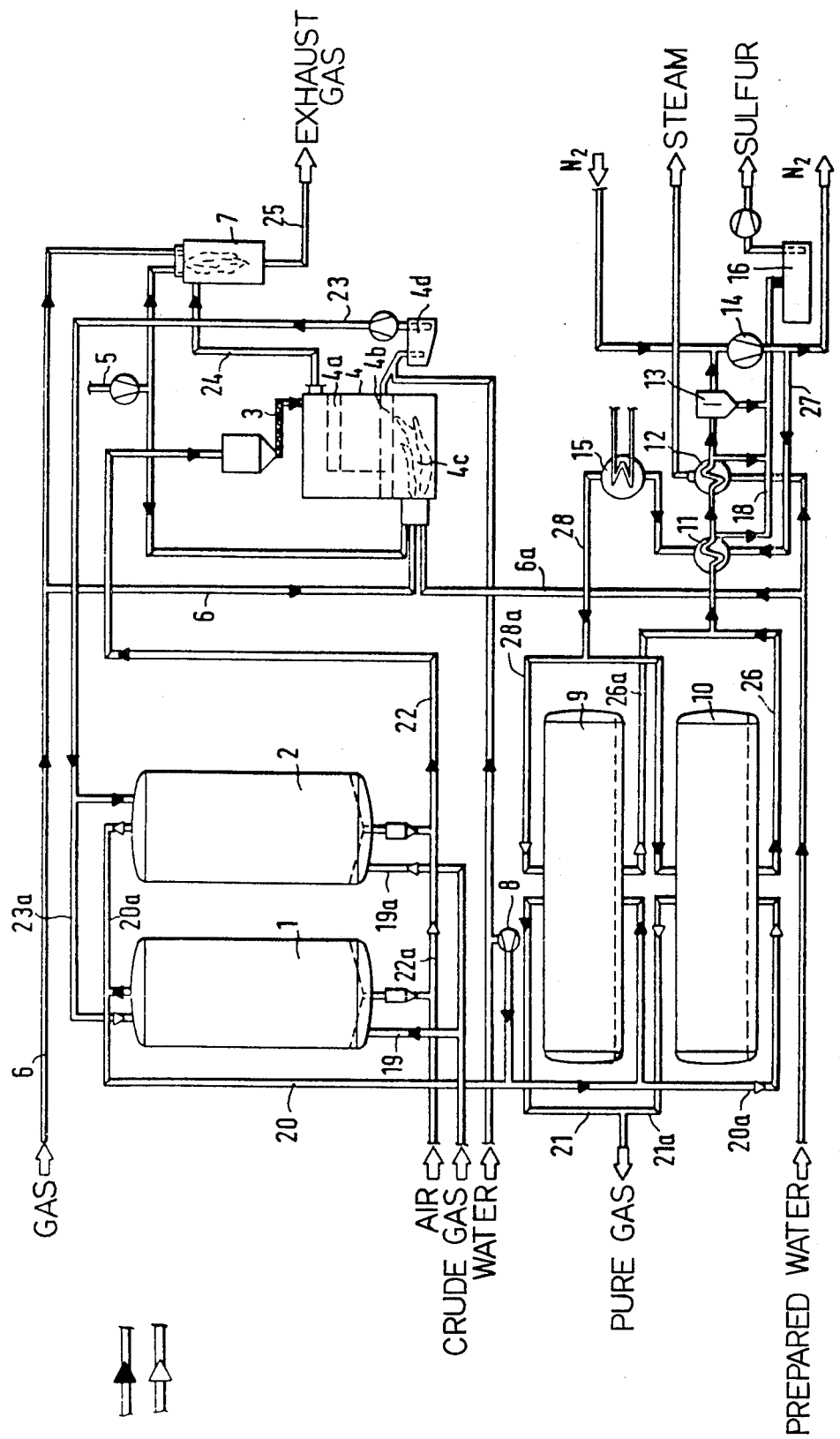

METHOD FOR THE ADSORPTIVE REMOVAL OF HYDROGEN SULFIDE FROM GAS MIXTURES

The invention relates to a method in accordance with the preamble of claim 1.

The removal of hydrogen sulfide from technical gases is performed in accordance with numerous known methods which relate to wash as well as adsorption methods.

Under the absorption methods, the method under oxidative adsorption on activated carbon or iron oxides are relatively often performed, however, these methods are only successful when the hydrogen sulfide concentration is between 10 g $H_2S/m^3$ in the gas to be cleaned. The same is true for the adsorptive methods which are under chemical reaction with iron oxide or zinc oxide.

It is further known, to remove hydrogen sulfide from oxygen free gas mixtures by adsorption on zeolitic molecular screens. These known methods are used when cleaning natural gas, for example. However, depending on the $H_2S$ partial pressure, $H_2S$ charges of the molecular screens of only 4–5% by weight are obtained. The regeneration of the zeolitic molecular screens must be performed with oxygen free inert gas or superheated steam at 300°–400° C. In addition to the high desorption temperatures, the simultaneous adsorption of $CO_2$, as well as the high adsorption selectivity with respect of water are further disadvantages of this known method (DE-OS No. 25 30 091).

It is also known, to remove hydrogen sulfide by adsorption on activated carbon from the gas mixtures. However, these methods remained without any practical importance due to the low chargeability of the activated carbons with hydrogen sulfide. (Hedden and Schnürer, Freiberger Forschungshefte A 413). It is an object of the invention to improve the removal of the hydrogen sulfide in the aforementioned adsorption method in such a manner that neither the disadvantages of the known wash method nor the adsorption method with zeolitic molecular screens are present.

This object of the invention is obtained by the characterizing features of claim 1.

Surprisingly, it was found that with these carbon containing molecular screens $H_2S$ reception capacities can be obtained which are above the factor of 2–3 of commercially available activated carbons.

For example, the following table shows the differences in the size of the micropore volume, measured by the methanol adsorption, between the carbon containing molecular screens used in accordance with the invention and the commercially activated carbon in $cm^3/100$ g adsorption agent.

|  | Micropore diameter | | |
| --- | --- | --- | --- |
|  | r < 10 nm | r < 0.16 nm | 0.35–10 nm |
| Inventive carbon containing micropore volume Molecular screen No. | | | |
| 1 | 20.8 | 5.0 | 6 |
| 2 | 17.5 | 5.3 | 5 |
| 3 | 16.6 | 4.2 | 3 |
| 4 | 17.4 | 3.9 | 3 |
| Commercially available activated carbon | | | |
| F 400  company | 53.6 | 5.3 | 30.0 |
| BPL  Chemviron | 48.9 | 5.9 | 24.2 |
| Sorbonorit III company Norit | 57.5 | 5.8 | 29.1 |

Particular embodiments of the invention are stated in the subclaims. The oxygen content of the gas mixture which is fed into the adsorption reactor should be maintained preferably below 0.01% by volume, since this could result in oxidation of $H_2S$ into sulfur and its deposition in the pores. In the catalyst bed which is suggested for the oxygen removal and which is switched in front of the adsorption reactor, a potassium iodine saturation of the catalyst feeds the reaction (for example, an activated carbon). With the inventive use of defined specific molecular screens it is possible to remove hydrogen sulfide from gas mixtures with only 0.001% by volume $H_2S$ up to 70% by volume $H_2S$ in the gas at flow speeds of 1–40 cm/s in the adsorption reactor with an almost 100% desulfurization degree. At any rate, the $H_2S$ content can be lowered below the index level.

The $H_2S$ charged molecular screens may be regenerated in accordance with all known methods. The selection is dependent on the $H_2S$ concentration in the gas mixture as well as from the desired purity of the product gas. With high $H_2S$ contents, a mere change in pressure method is suggested, wherein the pure gas as well as the separated hydrogen sulfide are yielded with a concentration of over 98%. If a fine cleaning is desired, the quality of the pure gas can be improved by rinsing, or an increase in temperature during the change of pressure regeneration. However, the molecular screens may be regenerated solely by a temperature change process.

Carbon containing molecular screens with the micropore volume required by the invention (measured with methanol adsorbtion) are obtained in a manner described in DE-PS No. 20 13 604, for example, in that a mixture of 80% by weight with air up to an oxygen content of about 12% oxidated pit coal (volatile components 20% waf) and 20% by weight pitch with a softening point in accordance with Krämer-Sarnow of 40° C. is pressed into blanks which are carbonized at a temperature of up to 900° C. for 1 h.

30 kg of this carbonized blank material are then activated in a rotary kiln at a temperature of 900° C. and under a water vapor charge of 8 l/h during a dwell time of about 92 min. Thereafter, the water vapor flow is discontinued and the product is cooled in a flowing nitrogen atmosphere. At a temperature range of 500°–250° C. 3% by volume hydrogen is added to the nitrogen. After complete cooling, the molecular screen may be used in accordance with the invention.

With the inventive method a plurality of advantages are obtained, in contrast to the known methods. In addition to a complete $H_2S$ removal, even at $H_2S$ concentrations up to 90% by volume from gas mixtures, a high selective separating effect in a wide concentration range is obtained. Further advantages are a high $H_2S$ concentration in the desorption gas and no reduction of the separating capacity in moist and/or $CO_2$ gas mixtures.

The novel features which are considered characteristic of the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The FIGURE is a flow chart representation illustrative of systems capable of employment/modification for the method according to the present invention.

The reference numerals indicate as follows:
1; 2: pre-filter reactors
9; 10: absorber reactors
3: dosaging means
4: eddy bed furnace means
4a; 4b: upper, lower stages of furnace
4c: integrated heating means
4d: cooler means
11; 12: heat exchangers
5;8;14: gas feed means
15: superheater means
16: receiver
others: conduit connections

DESCRIPTION OF THE PREFERRED EMBODIMENTS

EXAMPLE 1

A gas mixture consisting of 5% volume $H_2S$ and 95% by volume nitrogen is separated into a nitrogen flow and a $H_2S$ flow at 1 bar and 20° C. in a known 2-adsorber installation for gas separation by adsorption and desorption. The separation is performed by using the carbon containing molecular screen No. 2 of the aforementioned table.

The gas charge is 100 l/h at a flow speed of 6.1 cm/s. The regeneration of the molecular screen is performed after 15 min. by lowering the pressure to 0.05 bar.

The nitrogen flow has a purity of 99.5%, that is, 90% of the hydrogen sulfide were removed. Hydrogen sulfide is recovered in a concentration of about 70–80% by volume.

EXAMPLE 2

A gas mixture consisting of 33.9% by volume $H_2S$ and 66.1% by volume hydrogen is separated into a hydrogen flow and a $H_2S$ flow at 1 bar and 20° C. in the adsorber installation used in example 1. The molecular screen 4 of the aforementioned table is used which contains carbon.

The gas charge is 50 l/h at a flow speed of 3.1 cm/s. The regeneration of the molecular screen was performed after 4 min. by lowering the pressure to 0.05 bar.

Even after 1000 cycles the molecular screen did not show any reduction in service life. A hydrogen-product gas-flow with a purity of 98–99.5% is obtained in an unchanged manner. The hydrogen sulfide flow is present with a purity of 98%.

We claim:
1. Method for the adsorptive removal of hydrogen sulfide from gas mixtures in carbon containing absorption agents by adsorption at pressures between 1–80 bar and regeneration, by pressure lowering and/or temperature change while simultaneously rinsing with a nonadsorbable or only negligibly adsorbable component of the gas mixture in an adsorption reactor, characterized in that a molecular carbon containing screen is used, made of fossil and/or critical bituminous fuel with at pore diameter smaller than 10 nm measured by methanol adsorption pore volume of 15–25 $cm^3/100$ g and micropore volume in the pore diameter range of 0.35–10 nm is smaller than 10 $cm^3/100$ g, wherein an inner surface of said molecular screen is relieved from surface groups which are capable of reacting with the $H_2S$ by means of an aftertreatment with a reducing gas.

2. Method for the adsorptive removal of hydrogen sulfide from gas mixtures in carbon containing adsorption agents by adsorption at pressures between 1–80 bar and regeneration, by pressure lowering and/or temperature change while simultaneously rinsing with a nonadsorbable or only negligibly adsorbable component of the gas mixture in an adsorption reactor, characterized in that a molecular carbon containing screen is used, made of fossil and/or critical bituminous fuel with at pore diameter smaller than 10 nm measured by methanol adsorption pore volume of 15–25 $cm^3/100$ g and micropore volume in the pore diameter range of 0.35–10 nm is smaller than 10 $cm^3/100$ g.

3. Method according to claim 2, wherein oxygen is removed from an oxygen-containing gas mixture before said gas mixture enters said adsorption reactor in such a manner that said gas mixture is fed through a known catalyst bed wherein a part of the $H_2S$ together with the oxygen to be removed is reacted into elemental sulfur.

4. Method in accordance with claim 1, characterized in that the oxygen is removed from an oxygen containing gas mixture before entering into the adsorption reactor in such a manner that the gas mixture is fed through a known catalyst bed wherein a part of the $H_2S$ together with the oxygen to be removed is reacted into elemental sulfur.

* * * * *